Oct. 13, 1953  H. C. ALLEN ET AL  2,655,651
ZERO CHECK OR CALIBRATING SYSTEM FOR PULSE ALTIMETERS
Filed March 30, 1949  3 Sheets-Sheet 3

Inventors:
HORACE C. ALLEN AND
RANDALL C. BALLARD.
BY
ATTORNEY

UNITED STATES PATENT OFFICE 2,655,651

ZERO CHECK OR CALIBRATING SYSTEM FOR PULSE ALTIMETERS

Horace Clifford Allen, Princeton, and Randall Clarence Ballard, Trenton, N. J., assignors to Radio Corporation of America, a corporation of Delaware Application March 30, 1949, Serial No. 84,398

11 Claims. (Cl. 343—13)

This invention relates generally to pulse echo distance measuring systems such as pulse echo altimeters, and particularly to such systems employing a cyclic gain control circuit in the receiver section to suppress the feed-through signal to the receiver section from the associated transmitter. Cyclic gain control is also known as sensitivity time control. The invention will be described, by way of example, with particular reference to altimeters.

It is desirable to provide for the zero calibration or zero check of altimeters mounted in aircraft while the aircraft is in flight so that the accuracy of the indicated distance can be checked quickly and without difficulty at times when the precise and accurate operation of the altimeter is of critical importance.

It is apparent that in any altimeter system that includes a transmitter and a receiver, a zero-altitude reflected pulse can be simulated irrespective of the altitude at which the altimeter is operated by switching the transmitter output directly into the receiver. In pulse echo altimeters, however, difficulties are en countered in employing this method because of the necessity of including in the receiver a cyclic gain control circuit which functions to suppress the feed-through signal from the transmitter when the altimeter is being operated at an altitude above that at which the amplitude of the feed-through signal is greater than that of the signal received after reflection from the object or surface, the distance of which is being determined. By the feed-through signal is meant the transmitter signal that unavoidably passes into the receiver to a certain extent. While this transmitter signal or initial pulse occurs before any echo pulses are received, it is troublesome if it feeds into the receiver with greater amplitude than the reflected or echo pulses. For one thing it may block or partially block the receiver. For another thing, it will make the automatic gain control circuit or AGC circuit ineffective since the AGC circuit is operated by the strongest received signal.

In the ordinary pulse echo altimeter system, the amplitude of the feed-through signal is equal to that of the received reflected signal at altitudes between about 1000 and 2000 feet. Accurate operation of the system can thus be obtained above these altitudes only by suppressing the feed-through signal for the duration of the transmitted pulse. Therefore, in a system of this type, it is necessary to remove the effect of the cyclic gain control of the receiver in order to simulate a zero-distance by diverting a portion of the transmitter output directly into the receiver since, otherwise, the cyclic control would prevent the simulated zero-distance pulse from controlling the circuits of the device that determine and indicate the distance from the altimeter to the source of the signal impressed upon the receiver. Also, a further difficulty ensues in restoring the altimeter to control by the pulses reflected from a distance in that the distance indicator, which also controls the magnitude of the output of the cyclic gain control, will have been run to the zero-distance indication position during the calibration operation and the unsuppressed feed-through signal, which at the altitude at which the zero check is being made, has a greater amplitude than that of the reflected signal being received at that altitude and will continue to maintain control of the altimeter.

One of the principal objects of the invention is to provide a method and means whereby the cyclic gain control is restored when a zero check operation has been completed and the altimeter is reset to its normal operating condition, and concomitantly therewith cause the distance indicator to move to a position that may closely approximate the altitude at which the altimeter is being sustained in space.

A further object of the invention is to provide a method and means whereby an altimeter zero may be quickly and easily verified and then returned to its normal operating condition by the movement of two-way position switches.

In general, the invention provides circuits and switching means so connected and arranged that during zero-check, energy from the transmitter is diverted into the receiver and the effect of the cyclic gain control of the receiver is removed so as to cause the distance indicator to run to the zero-distance indication position and whereby, when the switching means are returned to the altimeter operating position, the distance indicator is caused to run toward midscale thus restoring the effectiveness of the cyclic gain control circuit that it may control the receiver to suppress the feed-through signal and allow the normally weaker received reflected pulse to resume control of the indicator.

A further feature, according to one embodiment of the invention, is to momentarily desensitize the receiver when the switching means are returned to operating position thereby causing the indicator to run toward midscale and similarly release the system from control of the feed-through signal and allow the normally weaker reflected pulse to resume control.

A better understanding of the invention will be had from the following description made with reference to the accompanying drawings in which like reference characters are applied to similar elements.

Figure 4:
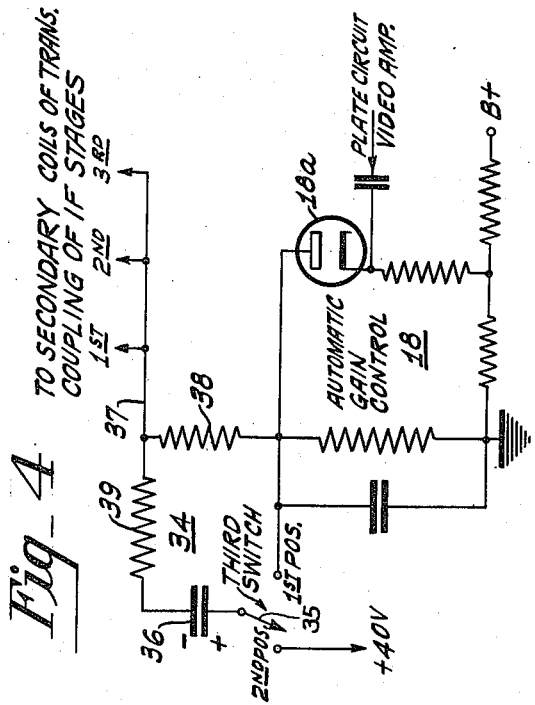
Figure 5:
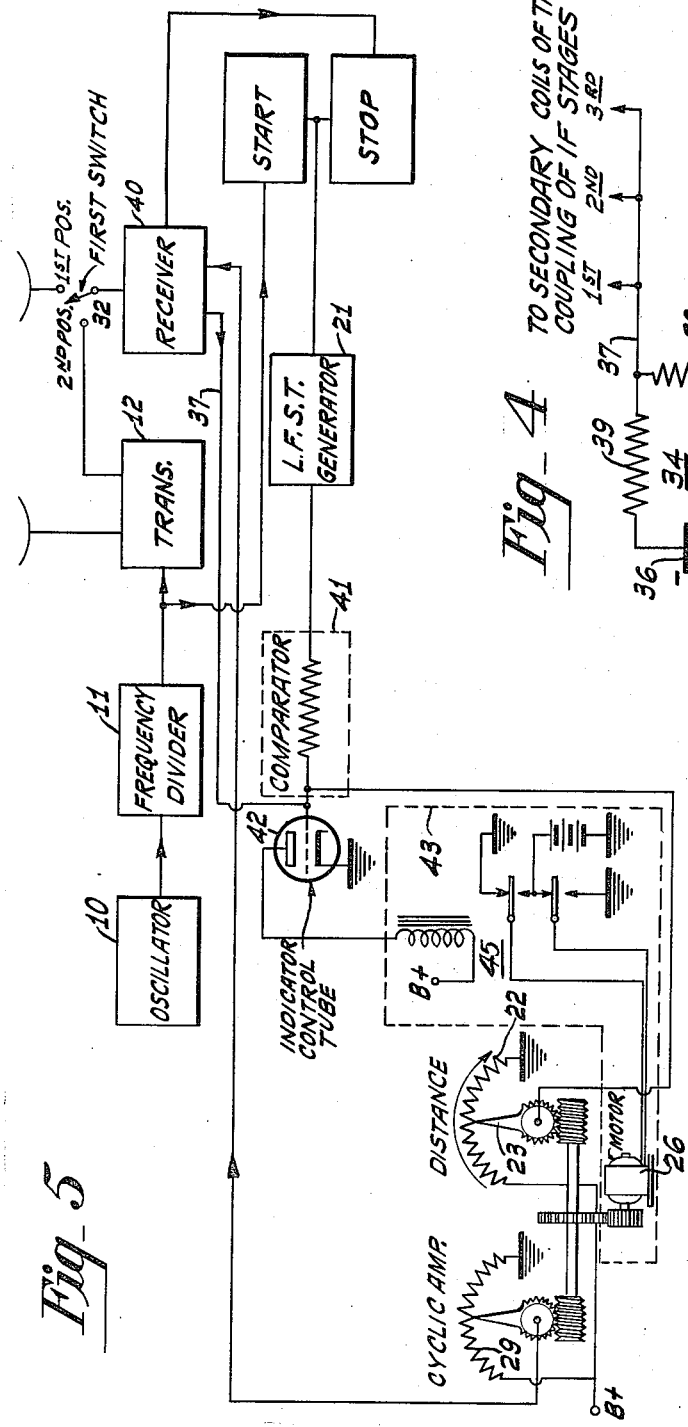

Figure 4 illustrates diagrammatically the manner and means by which an independent pulse of voltage may be applied to the receiver in order to release the receiver from the control of the feed-through signal from the transmitter; and Figure 5 is a circuit and block diagram of a pulse echo altimeter with a stop-start circuit and a cyclic amplitude potentiometer type of automatic cyclic gain control.

It is noted preliminarily that altimeters installed in aircraft are generally positioned some distance above the ground when the aircraft is resting on the ground. It is desirable, however, to have the distance indicated on the altimeter to refer to the distance between the ground and the lowest portion of the aircraft structure. It is, therefore, necessary to initially calibrate the altimeters so that the indicated distance is measured with respect to the lowest portion of the aircraft structure. This compensation will be constant for any particular installation and, when this compensation has been made, a signal feed directly from the transmitter to the receiver will cause a negative distance to be indicated. The time delay encountered by the signal in the receiver antenna due to their electrical constants will introduce an additional error which may be compensated for in a like manner. The error introduced by the time delay in the receiver system is also constant for any particular installation and consequently the altimeter may be set by an appropriate adjustment to a predetermined negative reading which will correspond to zero-distance reading with respect to the lowest portion of the aircraft structure. In the following discussion of the invention and in the claims, zero-distance will refer to the described compensated setting.

Figure 1:
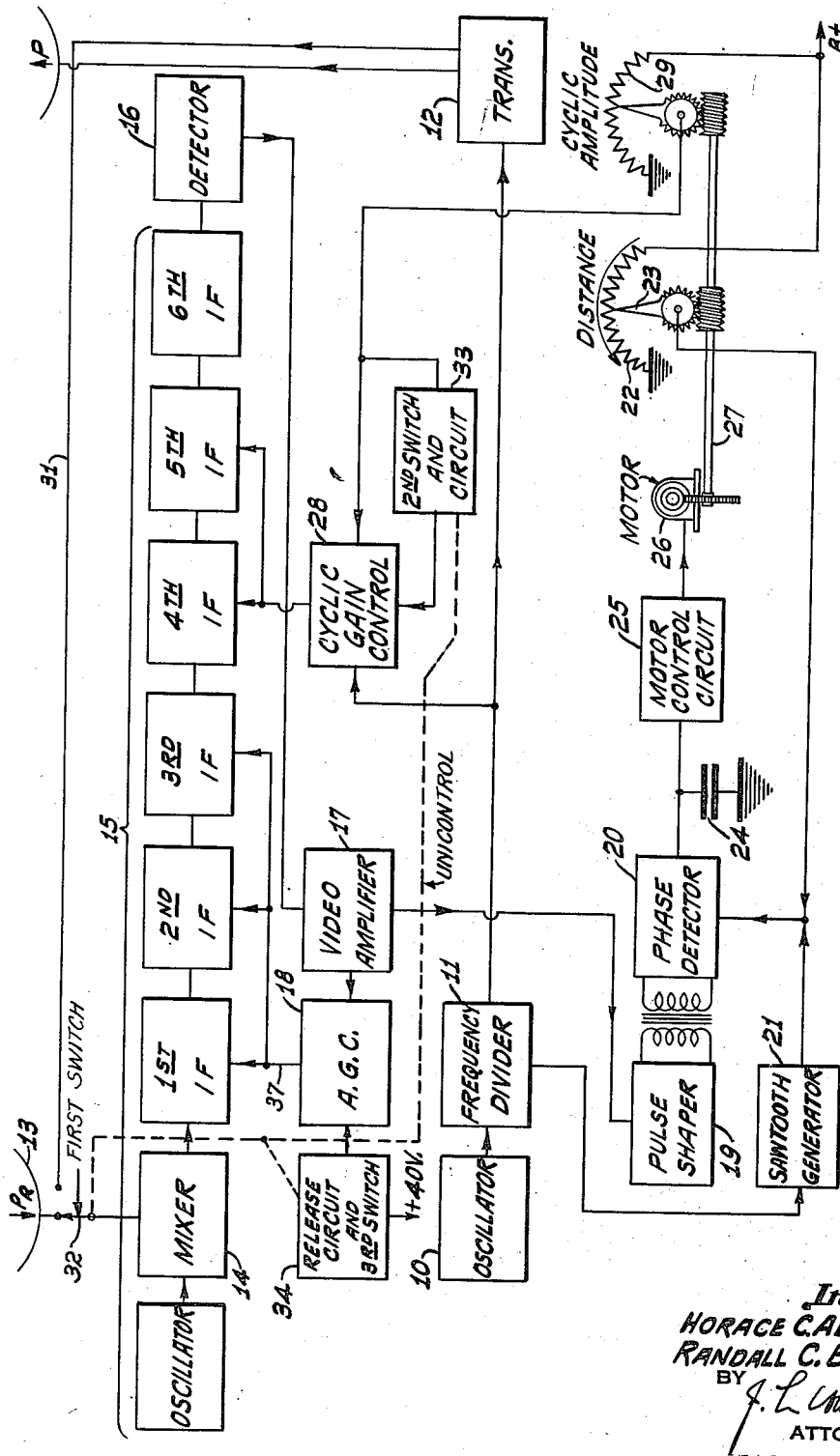
Figure 1 is schematic representation of a pulse echo altimeter including distance determining circuits and distance indicating means and including a cyclic amplitude potentiometer type of automatic cyclic gain control.

Figure 1 illustrates the manner in which the instant invention may be incorporated into a pulse echo altimeter described and claimed in United States application Serial No. 77,178, filed February 18, 1949, in the name of Randall C. Ballard, and entitled Pulse Echo Distance Measuring Systems. In general, altimeters of the type described in the aforementioned application comprise an oscillator 10, the output of which is applied to a frequency divider 11, which is sensitive to a frequency division of about 1 to 20. The output of the divider 11 is applied to key the transmitter 12 which thereupon broadcasts a pulse of high frequency radio energy. The pulse P is reflected back to the altimeter and picked up by the receiver antenna 13 as pulse Pr where it is passed to the mixer 14, mixed with the output of a local oscillator and thereafter amplified in the various stages of the receiver indicated generally at 15. The pulse thus amplified is rectified in the detector 16 and is applied to the grid of the video amplifier 17. The output of the video amplifier is applied both to the automatic gain control unit 18 and to the pulse shaper 19. The output of the pulse shaper 19 is employed to sensitize or key the phase detector 20, to which is applied a voltage generated by a low frequency sawtooth generator 21, which voltage is proportional to the propagation time of the pulse P, and to which is applied the voltage output of the range potentiometer 22, which output is proportional to the distance indicated by the indicator 23 at the instant the sampling or keying is effected by the output of pulse shaper 19. The operation of the phase detector 20 is such that differences from balance between the aforementioned voltages is established on a capacitor 24 and thereafter applied to the indicator control means which in this instance comprises the motor control circuit 25, the motor 26 and the shaft 27 operably connected to the motor and to the indicator arm 23. The output of the phase detector 20 as established on the capacitor 24 actuates the indicator control means in the direction and to the extent necessary to bring the indicated range into coincidence with the actual distance travelled by the reflected pulse.

The output of the frequency divider 11 is also applied to the grid of a tube in the cyclic gain control circuit 28, the output of which is applied to the control grids of the fourth and fifth stages of the I. F. amplifier strip to suppress the feed-through signal from the transmitter when the system is operating at altitudes at which the amplitude of the feed-through signal exceeds that of the reflected pulse. A variation in the output of the cyclic gain control circuit, which is related to distance indications, is obtained by means of the cyclic amplitude potentiometer 29 which in turn is operably connected with the distance indicator 23. Thus arranged, an automatically variable cyclic gain control is obtained whereby at low altitudes where the received reflected signal is strong and is able to override the feed-through signal, little or no cyclic gain control is applied to the receiver thereby avoiding inaccurate pulse forms which would result from cyclic suppression during the reception of such a reflected signal, and at high altitudes where the received reflected pulse is weaker than the feed-through signal, the cyclic gain control output is at its near maximum and thus suppresses the feed-through signal sufficiently to permit the weaker reflected pulse to control the altimeter indicator. An arrangement of this kind is described and claimed in application Serial No. 78,514, filed February 26, 1949, in the name of Horace C. Allen and entitled Pulse Echo Altimeter With Cyclic Gain Control.

Figure 2:
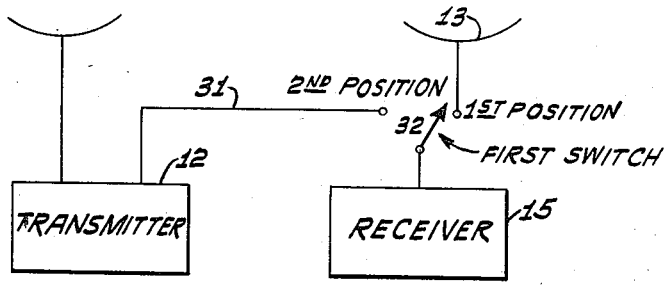
Figure 2 is a schematic illustration of the circuits employed in the selective coupling of the receiver to the transmitter and to the receiver antenna.

The instant invention is applied to the described system by providing a connection 31 between the transmitter 12 and the receiver 15. This connection comprises a first switch shown generally at 32 which in its second position (see Fig. 2) disconnects the receiver from its dipole antenna 13 and couples it to the transmitter 12 through a pick-up loop (not shown). The first position of switch 32, in which the receiver is connected to its dipole, represents the normal operating condition. When the switch 32 is positioned to couple the receiver 15 to the transmitter 12 a portion of the transmitter output is diverted to the receiver which is utilized therein as a simulated zero-distance source of pulses by means of which a zero-check of the distance indicator may be obtained.

A second switch 33 is incorporated into the screen grid circuit of the cyclic gain control tube 28a. (See Figure 3.) When this second switch is in its first position, corresponding to the altitude observation operation of the system, the tube functions in its normal manner. When this switch is in its second position, the output of the cyclic gain control tube is interrupted by the grounding of the screen grid.

A release circuit 34 (see Figures 1 and 4) includes a third switch 35, a capacitor 36, and a feed line 37 connected to the control grids of the first three stages of the I. F. amplifier. This circuit is arranged to apply a voltage (when switch 35 is moved from position 2 back to position 1) to effectively block the receiver which will cause the distance indicator 23 to move toward maximum-indicated distance as described hereinafter and thereby increase the output of the operably connected cyclic amplitude potentiometer to such a point that the control bias applied to the screen grid of cyclic gain control tube 28a is sufficient to cause the tube to conduct and thus cause suppression of the feed-through signal in the receiver.

The described switching means are inter-connected so that all may be positioned simultaneously to their first or normal operating position, or to their second or calibrating position.

Figure 3:
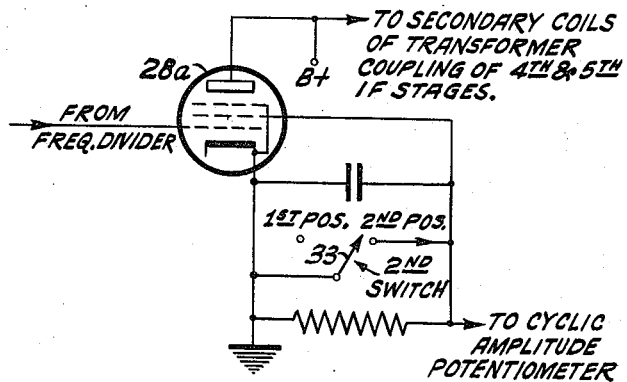
Figure 3 is a circuit diagram illustrating the manner of and the switching means employed to cut off the cyclic gain control from the receiver.

The detailed arrangement of the second switch and its associated circuits is illustrated in Figure 3 in which the cyclic gain control is shown to comprise a pentode 28a in which the output of the frequency divider 11 is applied to the control grid and the output of the cyclic amplitude potentiometer 29 is applied to the screen grid. A switch 33 is provided in the screen grid circuit of the tube which in its first position permits normal operation of the tube. When the switch is moved to its second position, the screen circuit of the tube is grounded out. The output of the plate circuit of the tube is applied to the secondary coils of the transformer coupling between the fourth and fifth stages of the I. F. amplifier.

The operation of the calibrating or zero-check devices thus assembled with the altimeter may be illustrated by assuming the altimeter is sustained at an altitude of about 4,000 feet during a calibrating operation. At this altitude, the amplitude of the feed-through signal exceeds that of the received reflected pulse and cyclic gain control is being applied to the fourth and fifth stages of the receiver to suppress the feed-through signal and permit the reflected signal to maintain control of the altimeter. While these conditions are prevailing the three switches 32, 33 and 35 are shifted to the second or zero-check position. This will cause a portion of the transmitter output to be delivered into the receiver through the feed line 31 and the first switch 32. Simultaneously therewith the cyclic gain control will be removed from the fourth and fifth stages of the receiver as a result of the screen grid circuit of the cyclic gain control tube 28a being shorted and the screen grid being grounded by the second switch. The simulated pulse diverted from the transmitter is thus permitted to control the distance determining the distance indicating units. At the same time a potential of about 40 volts will be established on the capacitor 36 following operation of the third switch 35. The distance indicator will thus run to the zero-distance indication under the effect of the simulated reflected pulse.

In the event that the distance indicator is not in coincidence with the zero-distance indication at this time, adjustment may be made to correct the setting.

Thereafter, the three switches are returned to their first or normal operating position. The simulated zero-distance pulse being received across the first switch 32 will be removed and the control bias, applied to the cyclic gain control tube 18a by the cyclic amplitude potentiometer 29, will be restored at zero-distance indication. However, the output of the cyclic amplitude potentiometer is zero and no control bias will be applied to the fourth and fifth stages of the intermediate frequency amplifier strip. As a result, the stronger feed-through signal will maintain control of the system and the altimeters will be locked on the zero-distance indication. At the same time, however, the third switch 35 has placed the charged capacitor 36 across the resistors 38 and 39 and a negative voltage will be applied through the conductor 37 to the three I. F. stages to block them. For reasons explained later, the phase detector 20 will develop a negative voltage. The indicator control means, which includes the control circuit 25, is characterized so that it will respond to the negative voltage thus applied by moving the indicator towards midscale. The control circuit 25 may be of any suitable type. It may, for example, be of the type shown in Fig. 5 comprising the triode 42 and the relay 45. In the course of the indicator's movement towards midscale, the operably connected cyclic amplitude potentiometer output will be increased and at approximately 3,700 feet will have increased to its maximum output. At this point, the control bias applied to the cyclic gain control tube by the cyclic amplitude potentiometer will be sufficient to cause the tube to develop an output which when applied to the fourth and fifth stages of the I. F. amplifier will be sufficient to suppress the feed-through signal from the transmitter and permit the received reflected signal to regain control of the altimeter.

Figure 5 illustrates the manner in which the invention may be applied to a pulse altimeter of the type utilizing start-stop circuits as a means of developing a sawtooth voltage that is proportional in amplitude to the propagation time of the transmitted and reflected pulse. Pulse altimeters of this type are more fully described and claimed in United States application Serial No. 40,146, filed July 22, 1948, in the names of Wolff and Herbst and entitled Pulse Echo Altimeter With Mechanically Driven Indicator, now Patent No. 2,513,988 issued July 4, 1950. The receiver 40, illustrated in Figure 5, is similar to that described in connection with the phase detector type of altimeter previously disclosed. This receiver may be considered to include the elements indicated generally by the character 15 of Figure 1 and also detector 16, video amplifier 17, automatic gain control 18, cyclic gain control 28, and the three switches 32, 33 and 35 and associated circuits previously described. In the altimeter represented in Figure 5, the release circuit feed line 37 is connected to the junction of the comparator 41 and the indicator control tube 42 to apply a negative voltage thereto to cause the indicator to move up-scale. In this instance the indicator control means comprises the indicator control tube 42 and the relays and motor indicated generally by 43. The range potentiometer and distance indicator and the cyclic amplitude potentiometer are similarly arranged and operably connected in the manner previously described in connection with the phase detector type of altimeter. The calibration operation and the performance of the circuits during the calibration are essentially similar to those previously discussed.

More detailed reference will now be made to the operation of the circuit of Figure 1 under the control of the circuit shown in Figure 4. There is utilized a characteristic of the phase detector 20 to provide the negative control voltage to be applied to the indicator or motor control means to cause the indicator to move toward maximum scale reading and thus release the altimeter from the control of the feed-through signal.

It is a characteristic of the phase detector 20 employed as a distance determining means in the application of Ballard previously referred to that in the absence of a receiver signal the phase detector will develop a negative voltage from the low frequency sawtooth generator 21 which, when applied to the indicator or motor control means, will cause the indicator to move up-scale. This characteristic is utilized by feeding the independent and limited source of energy developed by the capacitor 36 to the control grid circuits of the first three stages of the I. F. amplifier. The potential developed across the resistor 38 and applied to the first three I. F. stages will effectively block the receiver to the feed-through signals and no pulse will arrive at the phase detector 19 during the blocking. At this time, the phase detector will develop a negative voltage which, when applied to the indicator control means, will cause the indicator to move up-scale.

It is apparent that the blocking of the receiver by the release circuit or the application of control voltage to the indicator control means directly by the release circuit must persist for a few seconds to provide sufficient time for the indicator to be driven past the point at which the related cyclic amplitude potentiometer output is sufficient to cause adequate suppression of the feed-through signals from the transmitter in the fourth and fifth stages of the I. F. amplifier. In the circuit illustrated in Figure 4, this is accomplished by setting the resistance 38 at about 3.3 meghoms, the resistance 39 at 1 megohm, and the capacitor 36 at .25 microfarad. These values are given merely by way of example as, obviously, other values may be used. Thus constituted, this circuit will cause the discharge of the conductor to persist for several seconds when the switches are restored to their first or normal operating position and will provide sufficient time for the distance indicator to be positioned beyond the point at which maximum cyclic amplitude potentiometer voltage is established, and the system unlocked from the feed-through signals and restored to the control of the received reflected pulse.

What is claimed is:

1. A pulse echo distance determining system for determining the distance to a reflecting object that includes a pulse transmitter, a reflected pulse receiver, said receiver including a sensitivity time control circuit for suppressing feed-through signals from the transmitter, a motor, a distance indicator driven by said motor, a distance indicator control circuit connected by way of said motor to said indicator, means under the control of said distance indicator control circuit for decreasing the amount that said sensitivity time control circuit reduces the gain of said receiver as said distance decreases, switching means for applying directly to the receiver a portion of the transmitter output and for simultaneously therewith disconnecting the sensitivity time control circuit from the receiver, whereby the indicator in response to said transmitter output will run to its zero-distance indication position; means for thereafter eliminating the application of the said portion of the transmitter output to the receiver and for simultaneously therewith connecting the sensitivity time control circuit to the receiver, and means for applying to the distance indicator control circuit for a short period of time only a voltage of the correct polarity and of sufficient amplitude so that said indicating means will be moved to such a position that the sensitivity time control circuit output will suppress in the receiver the feed-through signals from the transmitter and normal received reflected pulse control is reestablished.

2. A pulse echo distance determining system for determining the distance to a reflecting object that includes a pulse transmitter, a reflected pulse receiver, said receiver including a sensitivity time control circuit for suppressing feed-through signals from the transmitter, a motor, a distance indicator driven by said motor, a distance indicator control circuit connected by way of said motor to said indicator, means under the control of said distance indicator control circuit for decreasing the amount that said sensitivity time control circuit reduces the gain of said receiver as said distance decreases, switching means for simultaneously diverting a portion of the transmitter output directly into the receiver and for cutting off the sensitivity time control circuit ouput to the receiver, thereby permitting the indicator in response to said transmitter output to run to its zero-distance indication position, means for establishing a limited independent source of electric power, and means for thereafter simultaneously cutting off the diverting of the portion of the transmitter output to the receiver and for re-applying sensitivity time control to the receiver, and means for making the previously established source of power effective to apply to the indicator control circuit a voltage of the correct polarity and of sufficient amplitude so that the indicator will move to such a position that the related sensitivity time control output will suppress feed-through signals from the transmitter and normal received pulse control will be restored.

3. A pulse echo distance measuring system that includes a pulse transmitter, a receiver for receiving and amplifying the received reflected pulse, the said receiver including an intermediate frequency amplifier, a sensitivity time control circuit connected to and regulating the gain of one group of stages of the intermediate frequency amplifier whereby the feed-through signals from the transmitter to the receiver are suppressed, and distance determining circuits and an indicator normally responsive to the received reflected and amplified pulse and arranged and constituted to move towards maximum indicated distance in the absence of a received reflected pulse, means for causing the output of said sensitivity time control circuit to decrease in response to a decrease in said indicated distance, means for diverting a portion of the transmitter output directly into the receiver and for simultaneously therewith cutting off the sensitivity time control to the receiver, thereby permitting the indicator in response to said transmitter output to run to its zero-distance indication position, means for thereafter simultaneously cutting off the diverting of the portion of the transmitter output to the receiver and for re-establishing sensitivity time control to the receiver, and means for applying an independent source of power to a group of stages of the intermediate frequency amplifier for a short interval, whereby the distance indicator will move towards maximum indicated distance to such a position that the related sensitivity time control output will override the feed-through signals from the transmitter and normal received reflected pulse control will be restored.

4. A pulse echo distance measuring system that includes a pulse transmitter, a receiver for receiving and amplifying the received reflected pulse, the said receiver including an intermediate frequency amplifier, a sensitivity time control circuit connected to and regulating the gain of one group of stages of the intermediate frequency amplifier whereby the feed-through signals from the transmitter to the receiver are suppressed, and distance determining circuits and an indicator normally responsive to the received reflected and amplified pulse and arranged and constituted to move towards maximum indicated distance in the absence of a received reflected pulse, means for causing the output of said sensitivity time control circuit to decrease in response to a decrease in the indicated distance, means for simultaneously diverting a portion of the transmitter output directly into the receiver and for cutting off the sensitivity time control output to the receiver, thereby permitting the indicator in response to said transmitter output to run to its zero-distance indication position whereby the zero-distance indication position may be adjusted to zero reading, means for establishing a limited independent source of electric power, and means for thereafter simultaneously cutting off the diverting of the portion of the transmitter output to the receiver and for re-establishing sensitivity time control to the receiver, and means for applying the limited independent source of power to a group of stages of the intermediate frequency amplifier, whereby the distance indicator will move towards maximum indicated distance to such a position that the related sensitivity time control output will suppress feed-through signals from the transmitter and permit normal received reflected pulse control to be restored.

5. A pulse echo distance measuring system comprising means for transmitting a pulse of radio energy, means for receiving said pulse after reflection, a first switching means selectively connecting said transmitter means to a first position at which the output of the transmitter is broadcast to a reflecting object and to a second position at which a portion of the output is connected directly to said receiving means, said receiving means including an intermediate frequency amplifier comprising a plurality of stages, a sensitivity time control circuit connected to at least one of said stages for suppressing feed-through signals from the transmitter, a distance determining means, a motor and a distance indicator means driven by said motor, an indicator control means responsive to said determining means and connected to said indicator means by way of said motor, said sensitivity time control circuit including a second switching means selectively in its first position connecting the sensitivity time control circuit output to the receiver and in its second position cutting off said sensitivity time control output to the receiver, means for making the effectiveness of said sensitivity time control circuit vary as a function of the distance reading of said distance indicator, a release circuit comprising a third switching means selectively making an independent source of control potential effective to apply to said indicator control means a voltage of the correct polarity and of sufficient amplitude and duration so that said control means will move the distance indicator to a position where the sensitivity time control circuit will suppress feed-through signals from the transmitter.

6. A pulse echo distance measuring system comprising means for transmitting a pulse of radio energy, means for receiving said pulse after reflection, a first switching means selectively connecting said transmitter means to a first position at which the output of the transmitter is broadcast to a reflecting object and to a second position at which a portion of the output is connected directly to said receiving means, said receiving means including an intermediate frequency amplifier comprising a plurality of stages, a sensitivity time control circuit connected to at least one of said stages for suppressing feed-through signals from the transmitter, a distance determining means, a motor and a distance indicator means driven by said motor, an indicator control means responsive to said determining means and connected to said indicator means by way of said motor, said sensitivity time control circuit including a second switching means selectively in its first position connecting the sensitivity time control circuit output to the receiver and in its second position cutting off said sensitivity time control output to the receiver, means for making the effectiveness of said sensitivity time control circuit vary as a function of the distance reading of said distance indicator, a release circuit including a capacitor and a third switching means, said third switching means selectively connecting in its first position the said capacitor to an independent charging source and in its second position connecting the said indicator cotrol means to a control potential that is made effective by the discharge of said capacitor.

7. An altimeter defined in claim 5 characterized by all of said switches being interconnected for movement simultaneously to all of their first positions or to all of their second positions.

8. A pulse echo distance measuring system comprising means for transmitting a pulse of radio energy, means for receiving said pulse after reflection, a first switching means selectively connecting said transmitter means to a first position at which the output of the transmitter is broadcast to a reflecting object and to a second position at which a portion of the output is connected directly to said receiving means, said receiving means including an intermediate frequency amplifier comprising a plurality of stages, a sensitivity time control circuit connected to a group of said stages for suppressing feed-through signals from the transmitter, a distance determining means including a phase detector, a motor and a distance indicator means driven by said motor, an indicator control means responsive to said phase detector and connected to said indicator means by way of said motor, said sensitivity time control circuit including a second switching means selectively in its first position connecting sensitivity time control circuit output to the receiver and in its second position cutting off said sensitivity time control output to the receiver, means for making the effectiveness of said sensitivity time control circuit vary as a function of the distance reading of said distance indicator, a release circuit comprising a third switching means selectively making an independent source of control potential effective to apply to said indicator control means a voltage of the correct polarity and of sufficient amplitude and duration so that said control means will move the distance indicator to a position where the sensitivity time control circuit will suppress feed-through signals from the transmitter.

9. The invention according to claim 8 wherein said third switching means selectively connects an independent source of control potential to a group of stages of said intermediate frequency amplifier.

10. A pulse echo distance measuring system comprising means for transmitting a pulse of radio energy, means for receiving said pulse after reflection, a first switching means selectively connecting said transmitter means to a first position at which the output of the transmitter is broadcast to a reflecting object and to a second position at which a portion of the output is connected directly to said receiving means, said receiving means including an intermediate frequency amplifier comprising a plurality of stages, a sensitivity time control circuit connected to a group of said stages for suppressing feed-through signals from the transmitter, a distance determining means including a phase detector, a motor and a distance indicator means driven by said motor, an indicator control means responsive to said phase detector and connected to said indicator means by way of said motor, said sensitivity time control circuit including a second switching means selectively in its first position connecting sensitivity time control circuit output to the receiver and in its second position cutting off said sensitivity time control output to the receiver, means for making the effectiveness of said sensitivity time control circuit vary as a function of the distance reading of said distance indicator, a release circuit including a capacitor and a third switching means selectively connecting in its first position the said capacitor to an independent charging source and in its second position a group of stages of said intermediate frequency amplifier to a control potential developed by the discharge of said capacitor.

11. An altimeter defined in claim 5 characterized by the first and second switches being interconnected with each other for movement simultaneously to their first positions or to their second positions, and said third switch being interconnected with said first and second switches for selectively making the said independent source of control potential effective to apply to said indicator control means said voltage of the correct polarity when said first and second switches are moved simultaneously to their first positions.

HORACE CLIFFORD ALLEN.
RANDALL CLARENCE BALLARD.

References Cited in the file of this patent

UNITED STATES PATENTS

| Number | Name | Date |
| --- | --- | --- |
| 2,422,074 | Bond | June 10, 1947 |
| 2,433,681 | Blumlein | Dec. 30, 1947 |